US011277601B2

(12) United States Patent
Cooper et al.

(10) Patent No.: US 11,277,601 B2
(45) Date of Patent: *Mar. 15, 2022

(54) DYNAMIC RANGE FOR DEPTH SENSING

(71) Applicant: X Development LLC, Mountain View, CA (US)

(72) Inventors: Emily Cooper, San Francisco, CA (US); Fengqiang Li, Chicago, IL (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,472

(22) Filed: Nov. 12, 2020

(65) Prior Publication Data

US 2021/0067719 A1 Mar. 4, 2021

Related U.S. Application Data

(63) Continuation of application No. 16/376,373, filed on Apr. 5, 2019, now Pat. No. 10,863,118, which is a
(Continued)

(51) Int. Cl.
*H04N 5/235* (2006.01)
*H04N 5/355* (2011.01)
(Continued)

(52) U.S. Cl.
CPC ....... *H04N 13/243* (2018.05); *G01B 11/2513* (2013.01); *G01S 1/00* (2013.01);
(Continued)

(58) Field of Classification Search
None
See application file for complete search history.

(56) References Cited

U.S. PATENT DOCUMENTS 3,949,160 A 4/1976 Heurtley
5,048,067 A 9/1991 Horbaschek
(Continued)

OTHER PUBLICATIONS

Graduated neutral-density filter, Wikipedia, the free encyclopedia, last modified on Sep. 23, 2016, first retrieved on Oct. 22, 2016, https://en.wikipedia.org/w/index.php?title=Graduated_neutral-density_filter&oldid=740808643.
(Continued)

*Primary Examiner* — Mohammad J Rahman
(74) *Attorney, Agent, or Firm* — McDonnell Boehnen Hulbert & Berghoff LLP

(57) ABSTRACT

An example system includes a patterned light projector operable to direct first and second portions of patterned light toward first and second surfaces, respectively, in an environment. The first and second surfaces may be at first and second distances, respectively, from the structured light projector. A graduated optical filter may be situated along an optical path of the patterned light. The graduated optical filter includes first and second regions to attenuate an intensity of the first and second portions of the patterned light, respectively, by first and second amounts, respectively. The first amount is greater than the second amount. The system additionally includes an image sensor operable to generate image data based on at least the first and second portions of the patterned light and a processor configured to determine first and second values indicative of an estimate of the first and second distances, respectively, based on the image data.

20 Claims, 8 Drawing Sheets

Related U.S. Application Data continuation of application No. 15/362,861, filed on Nov. 29, 2016, now Pat. No. 10,277,842.

(51) Int. Cl.
  *H04N 13/243* (2018.01)
  *G01S 1/00* (2006.01)
  *G01B 11/25* (2006.01)
  *H04N 5/238* (2006.01)

(52) U.S. Cl.
  CPC .......... *H04N 5/238* (2013.01); *H04N 5/2351* (2013.01); *H04N 5/2354* (2013.01); *H04N 5/35536* (2013.01)

(56) References Cited

U.S. PATENT DOCUMENTS

| | | | |
|---|---|---|---|
| 5,627,626 A | 5/1997 | Inoue et al. | |
| 5,691,784 A * | 11/1997 | Hausler | G01B 11/2536 349/1 |
| 6,600,168 B1 | 7/2003 | Geng | |
| 6,636,293 B1 | 10/2003 | Shiraishi | |
| 6,852,453 B2 * | 2/2005 | Wu | H01L 21/0274 257/E21.027 |
| 6,864,916 B1 | 3/2005 | Nayar et al. | |
| 6,961,045 B2 | 11/2005 | Tsao | |
| 7,084,905 B1 | 8/2006 | Nayar et al. | |
| 7,924,321 B2 | 4/2011 | Nayar et al. | |
| 7,999,858 B2 | 8/2011 | Nayar et al. | |
| 8,090,194 B2 | 1/2012 | Golrdon et al. | |
| 8,610,789 B1 | 12/2013 | Nayar et al. | |
| 8,661,372 B1 * | 2/2014 | Zhao | G03F 1/36 716/53 |
| 8,934,029 B2 | 1/2015 | Nayar et al. | |
| 9,819,872 B2 | 11/2017 | Yoshikawa et al. | |
| 2002/0018118 A1 | 2/2002 | Coulombe et al. | |
| 2003/0022393 A1 | 1/2003 | Seul et al. | |
| 2004/0023137 A1 | 2/2004 | Duesman et al. | |
| 2005/0171707 A1 | 8/2005 | Easley et al. | |
| 2006/0028718 A1 | 2/2006 | Seel et al. | |
| 2006/0085772 A1 * | 4/2006 | Zhang | G03F 1/36 716/52 |
| 2006/0122515 A1 | 6/2006 | Zeman et al. | |
| 2006/0197933 A1 | 9/2006 | Kawashima | |
| 2008/0117438 A1 | 5/2008 | Quirion et al. | |
| 2008/0118143 A1 | 5/2008 | Gordon et al. | |
| 2009/0295908 A1 | 12/2009 | Gharib et al. | |
| 2009/0300576 A1 * | 12/2009 | Huang | G03F 1/36 716/55 |
| 2009/0310111 A1 | 12/2009 | Arif | |
| 2010/0036644 A1 * | 2/2010 | Yang | G06F 30/39 703/1 |
| 2010/0074532 A1 | 3/2010 | Gordon et al. | |
| 2010/0110280 A1 | 5/2010 | Aoyama | |
| 2012/0307254 A1 | 12/2012 | Globus et al. | |
| 2014/0078264 A1 | 3/2014 | Zhang | |
| 2014/0168493 A1 | 6/2014 | Wang et al. | |
| 2016/0048969 A1 | 2/2016 | Zhao et al. | |
| 2016/0070410 A1 | 3/2016 | Lin et al. | |
| 2017/0116462 A1 * | 4/2017 | Ogasawara | G06K 9/209 |
| 2017/0350763 A1 | 12/2017 | Shafer et al. | |
| 2018/0125337 A1 * | 5/2018 | Thiel | A61B 1/00188 |
| 2021/0067719 A1 * | 3/2021 | Cooper | H04N 5/2351 |

OTHER PUBLICATIONS

Horseman 58mm Center Filter for SW Series Cameras with 45mm or 65mm Lenses, B&H Photo, Video, Pro Audio, first retrieved on Oct. 22, 2016, https://www.bhphotovideo.com/c/product/112285-REG/Horseman_29227_58mm_Center_Filter_for.html.

Tiffen 77mm Graduated 0.6 ND Filter, B&H Photo, Video, Pro Audio, first retrieved on Oct. 22, 2016, https://www.bhphotovideo.com/c/product/57842-REG/Tiffen_77CGND6_77mm_Graduated_Neutral_Density.html.

* cited by examiner

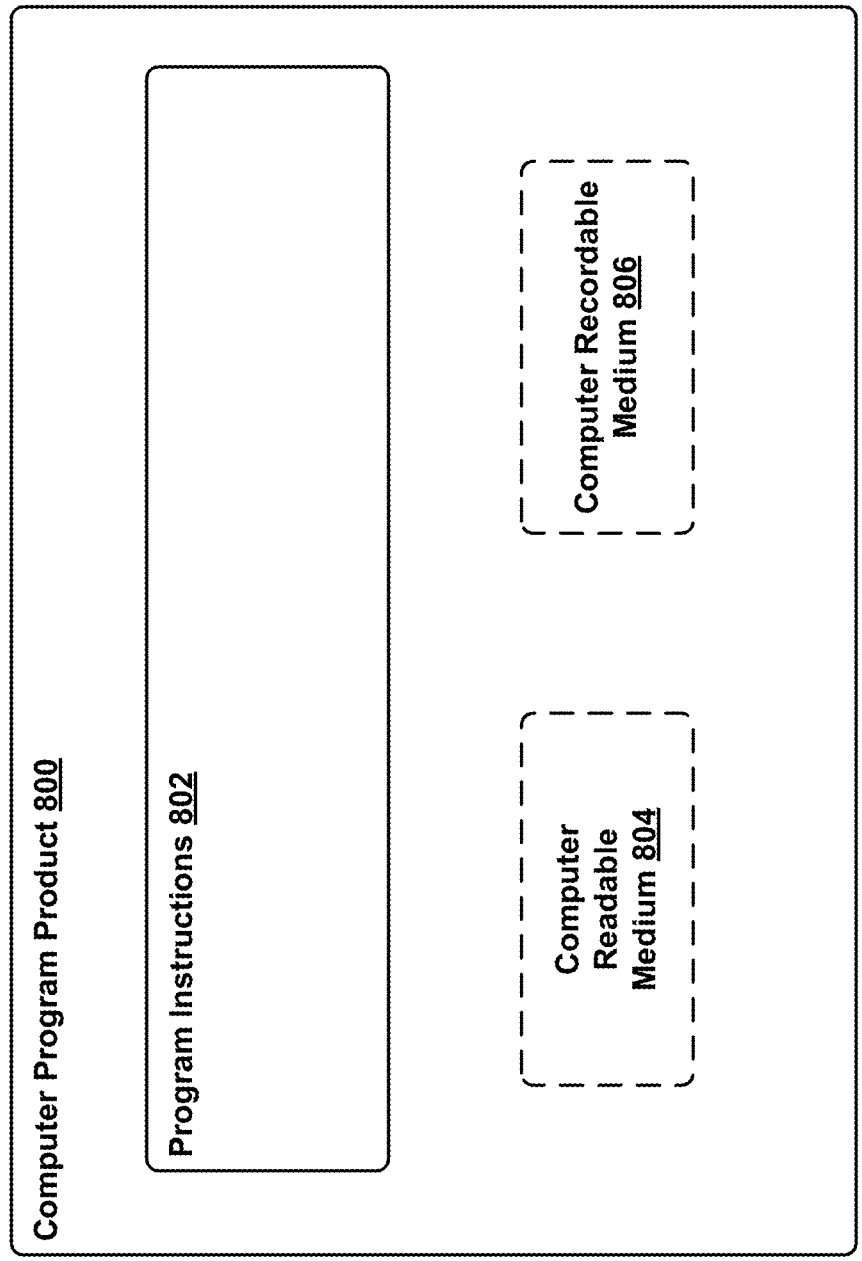

DYNAMIC RANGE FOR DEPTH SENSING

CROSS-REFERENCE TO RELATED APPLICATION

This application is a continuation of and claims priority to U.S. patent application Ser. No. 16/376,373, filed Apr. 5, 2019, which is a continuation of and claims priority to U.S. patent application Ser. No. 15/362,861, filed Nov. 29, 2016, each of which is hereby incorporated by reference in its entirety.

BACKGROUND

Imaging devices are used in various types of systems and perform a variety of functions. Some imaging devices may be used for applications involving manufacturing, assembly, image analyses, and depth sensing, among others. Over time, the manner in which these imaging systems operate is becoming more robust, efficient, and intuitive. As imaging systems are integrated into numerous aspects of modern life, it is desirable for imaging systems to operate effectively under many different types of conditions. Therefore, a demand for robust and accurate imaging systems has led to advances in the various components that form imaging systems, as well as within the image processing techniques used to analyze and interpret data from images captured by imaging systems.

SUMMARY

Example embodiments are provided herein for spatial modulation of patterned light projected onto surfaces or objects within an environment. An example system may include a patterned light projector, an image sensor, and an optical filter. The optical filter may be placed along an optical path between the patterned light projector and the image sensor to modulate the patterned light. The optical filter may include two or more regions configured to attenuate the patterned light by different amounts. Patterned light incident on surfaces close to the system may be attenuated to a greater extent than patterned light incident on surfaces distant from the system. The attenuation of patterned light may reduce a dynamic range of the light incident on the image sensor, thus improving the discernibility of the patterned light on both distant and nearby surfaces. The optical filter may be implemented statically, by a static graduated optical filter or a patterned mask with fixed feature size or opacity. Alternatively, the optical filter may be implemented dynamically, by a spatial light modulator controllable to modulate the intensity of light emitted by or transmitted through different portions of the spatial light modulator.

In one example, a system is provided that includes a patterned light projector operable to direct a first portion of patterned light toward a first surface in an environment and to direct a second portion of the patterned light toward a second surface in the environment. The first surface is at a first distance from the structured light projector and the second surface is at a second distance from the structured light projector. The system also includes a graduated optical filter situated along an optical path of the patterned light. The graduated optical filter includes a first region to attenuate an intensity of the first portion of the patterned light by a first amount and a second region to attenuate an intensity of the second portion of the patterned light by a second amount. The first amount is greater than the second amount. The system additionally includes an image sensor operable to generate image data based on at least the first portion of the patterned light and the second portion of the patterned light. The system further includes a processor configured to determine a first value indicative of an estimate of the first distance and a second value indicative of an estimate of the second distance based on the image data.

In a second example, a method is provided that includes projecting, by a patterned light projector, patterned light onto an environment. A first portion of the patterned light is directed toward a first surface in the environment and a second portion of the patterned light is directed toward a second surface in the environment. The method also includes generating, by an image sensor, first image data based on at least the first portion of the patterned light and the second portion of the patterned light. The method additionally includes determining a first extent of exposure of a portion of the first image data representing the first surface and a second extent of exposure of a portion of the first image data representing the second surface. The method further includes determining, based on the first extent of exposure and the second extent of exposure, a first amount by which to attenuate an intensity of the first portion of the patterned light and a second amount by which to attenuate an intensity of the second portion of the patterned light. The first amount is different from the second amount. The method yet further includes attenuating the intensity of the first portion of the patterned light by the first amount and attenuating the intensity of the second portion of the patterned light by the second amount. The method yet additionally includes generating, by the image sensor, second image data based on at least the first portion of the patterned light attenuated by the first amount and the second portion of the patterned light attenuated by the second amount.

In another example, a system is provided that includes means for projecting patterned light onto an environment. A first portion of the patterned light is directed toward a first surface in the environment and a second portion of the patterned light is directed toward a second surface in the environment. The system also includes means for generating first image data based on at least the first portion of the patterned light and the second portion of the patterned light. The system additionally includes means for determining a first extent of exposure of a portion of the first image data representing the first surface and a second extent of exposure of a portion of the first image data representing the second surface. The system further includes means for determining, based on the first extent of exposure and the second extent of exposure, a first amount by which to attenuate an intensity of the first portion of the patterned light and a second amount by which to attenuate an intensity of the second portion of the patterned light. The first amount is different from the second amount. The system yet further includes means for attenuating the intensity of the first portion of the patterned light by the first amount and attenuating the intensity of the second portion of the patterned light by the second amount. The system yet additionally includes means for generating second image data based on at least the first portion of the patterned light attenuated by the first amount and the second portion of the patterned light attenuated by the second amount.

In a further example, a depth-sensing device is provided that includes a patterned light projector operable to project patterned light onto an environment. A first portion of the patterned light is directed toward a first surface in the environment and a second portion of the patterned light is directed toward a second surface in the environment. The first surface is at a first distance from the structured light projector and the second surface is at a second distance from the structured light projector. The first portion of the patterned light includes features of a first size and the second portion of the patterned light includes features of a second size greater than the first size. The depth-sensing device also includes an image sensor operable to generate image data based on at least the first portion of the patterned light and the second portion of the patterned light. The depth-sensing device additionally includes a processor configured to determine a first value indicative of an estimate of the first distance and a second value indicative of an estimate of the second distance based on the image data.

In a yet further example, a system is provided that includes a means for projecting patterned light onto an environment. A first portion of the patterned light is directed toward a first surface in the environment and a second portion of the patterned light is directed toward a second surface in the environment. The first surface is at a first distance from the structured light projector and the second surface is at a second distance from the structured light projector. The first portion of the patterned light includes features of a first size and the second portion of the patterned light includes features of a second size greater than the first size. The system also includes means for generating image data based on at least the first portion of the patterned light and the second portion of the patterned light. The system additionally includes means for determining a first value indicative of an estimate of the first distance and a second value indicative of an estimate of the second distance based on the image data.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 8 is a schematic block diagram of an example computer-readable medium, according to an example implementation.

DETAILED DESCRIPTION

Figure 1:
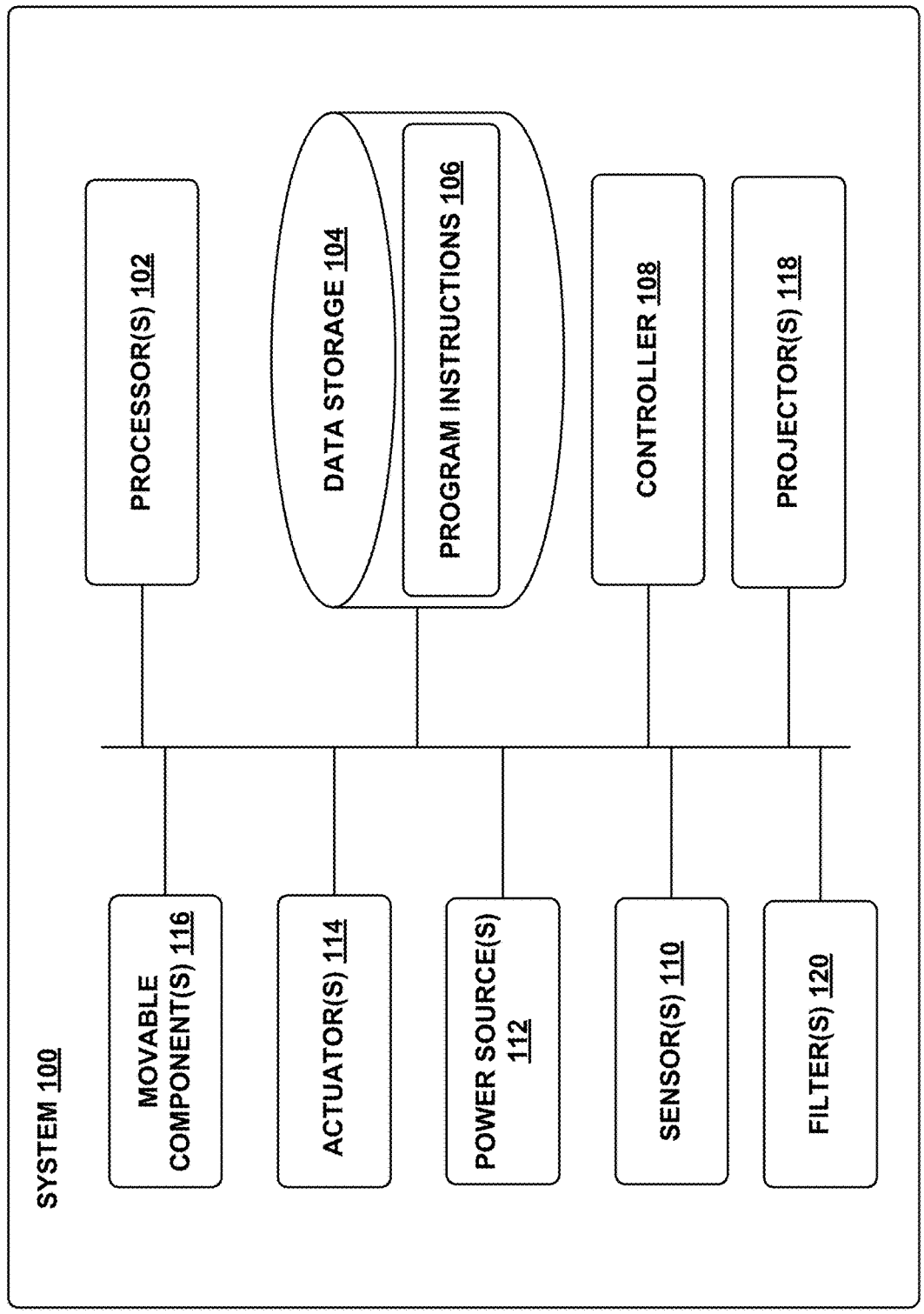
FIG. 1 illustrates a configuration of a system, according to an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. Overview

Some computer vision-based depth sensing techniques involve capturing one or more images of an environment, identifying features in the image or images, and using triangulation or other techniques to determine the distance of those features from a reference point. In stereoscopic implementations, a pair of cameras captures images from two different perspectives. Based on a known spatial relationship of the cameras and the positions of corresponding features in the two images, a computing device can estimate the distance to the feature or surface.

In some implementations, patterned light may be shone onto an environment to provide identifiable features on surfaces within the environment to aid in generating a depth map. The reflected patterned light may produce features on otherwise uniform or featureless surfaces. Additionally, computer vision techniques may analyze the deformation, size, luminance, or other aspects of the patterned light captured by an imager to generate a depth map of the environment.

While patterned light implementations can provide a means for robust and accurate depth sensing, such implementations may be affected by dynamic range and signal-to-noise ratio (SNR) limitations of an imaging system. During operation, a portion of light emitted by a projector is incident on a surface (e.g., a surface of an object of interest) within an environment. A portion of the light incident on the surface is reflected off the surface and is then incident on the photodetectors of the imager (e.g., image sensor such as a charge coupled device (CCD) sensor or complementary metal oxide semiconductor (CMOS) sensor). Due to physical properties of light and optics, surfaces close to the imager and/or projector may reflect a greater portion of the incident light back at the imager. Thus, surfaces close to the imager may appear brighter compared to surfaces far from the imager and/or projector.

The difference between the apparent brightness (e.g., from a particular vantage point) of nearby surfaces and distant surfaces may be significant enough to exceed the dynamic range of an imaging device. In these situations, longer exposure times may produce images where the projected patterned features are resolvable on distant surfaces and not resolvable on nearby surfaces (overexposure), while shorter exposure times may produce images where the projected patterned features are not resolvable on distant surfaces (underexposure) and resolvable on nearby surfaces. In some instances, a single exposure time allowing the projected patterned features to be resolvable on both distant and nearby objects might not be available.

In some cases, these dynamic range problems can be allayed by capturing two images of a scene at different exposures, and subsequently post-processing the multi-exposure image data to produce a "high dynamic range" (HDR) image. Because each "frame" involves multiple exposures and post-processing, this HDR technique takes considerably longer to perform for each individual image compared to a single exposure. Furthermore, if the position of the image sensor or the position of objects within the scene changes between exposures, the images are more difficult to combine. These disadvantages make such HDR techniques impractical for situations where a depth-sensing system or a camera may be frequently repositioned or reoriented (e.g., to capture a moving object).

In the present application, depth-sensing system implementations involve modulating light at a patterned light projector, at an image sensor, or some combination thereof to effectively narrow the range of brightness between reflections of the patterned light from distant surfaces and nearby surfaces. In some implementations, an optical filter such as, for example, a neutral density (ND) filter may be placed in front of the image sensor to filter or modulate the light incident on the image sensor. Alternatively, the optical filter may be placed in front of the patterned light projector to modulate the intensity of light projected onto the environment (e.g., to modulate the light before it is projected onto the environment), thus indirectly modulating the intensity of light incident on the image sensor. Alternatively or additionally, the optical filter may be placed within the light projector, between a light source of the projector and the environment.

The optical filter may be a graduated optical filter that includes two or more regions that decrease the intensity of light by different amounts. In particular, the graduated optical filter may be structured such that intense light reflected from nearby surfaces is attenuated by a greater amount than dim light reflected from distant surfaces. By normalizing the light intensity in this manner, a depth-sensing system can capture a single-exposure image that includes resolvable features of the projected patterned light on both distant and nearby surfaces. Such a graduated filter may be a "stepwise" filter (having two or more distinct regions of different levels of filtering), a "smooth" filter (having no distinct macroscopic regions, with varying levels of filtering at various regions of the filter), or some combination thereof.

Alternatively or additionally, an opaque mask may be placed between the light source or projector and the environment. The mask may include therein a plurality of gaps or features of varying size or opacity through which light may travel. The size or opacity of the gaps may vary across the area of the mask (e.g., in a stepwise or smooth manner, as discussed above). Thus, the mask may block a portion of the light emitted by the light source of the projector to thereby spatially modulate the intensity of projected light. As a further example, a spatial light modulator or other active filter (e.g., an electrically addressed spatial light modulator such as a liquid crystal (LC) spatial light modulator or a liquid crystal on silicon (LCoS) spatial light modulator) may modulate light output by a light source or projector to control the intensity of light projected onto different portions of the environment.

Regardless of the implementation, a filter or mask may be used to modulate the intensity of light projected onto various portions of an environment. For example, if a nearby surface is in the center of an image and distant surfaces are to the left and right of that nearby surface, the filter or mask may attenuate the intensity of light emitted toward the center of the environment (corresponding to the nearby surface) and may not attenuate (or attenuate less) the intensity of light emitted toward the left or right portions of the environment. Because an image sensor will receive a greater portion of the light reflecting off the nearby surface compared to the distant surfaces, the apparent brightness of distant surfaces compared to nearby surfaces may be more uniform (or, at a minimum, have a narrower dynamic range).

In some implementations, nearby surfaces may appear near the center region of the surface or mask. For example, robotic devices may, in order to navigate through an environment, be configured to focus the image sensor on nearby surfaces and objects. The nearby objects may be positioned within the center of the field of view of the image sensor (and thus within the center of the capture images) to capture the entire extent of the object to ensure accurate perception of the environment. In another example, an augmented reality device may be used to scan an environment and overlay additional information on top of the captured image of the environment. The user of the device may tend to focus on objects or surfaces closest to the user.

Alternatively, in other applications, the expected relative positioning of nearby and distant objects within the area of the field of view of the image sensor may be different from those of robots and augmented reality devices. Examples include industrial scenarios where spatial relationship between the sensor and objects of interest are well-defined in both space and time. Accordingly, the filter gradient or mask pattern may be designed to match the expected relative positioning. Specifically, the portion of the filter or mask expected to filter light incident on nearby objects may attenuate the light to a greater extent than the portions of the filter or mask expected to filter light incident on distant surfaces.

In further implementations, a depth-sensing system may dynamically or actively modulate light—emitted by a projector, incident on an image sensor, or both—based on either known or determined information about an environment. As one specific example, a depth-sensing system that includes a patterned light projector, a spatial light modulator (SLM), and an image sensor may initially project patterned light onto an environment without any modulation (or with uniform modulation, e.g., 50% intensity attenuation) and capture that light at the image sensor.

A processor may process the resulting image data to identify regions of overexposure and/or underexposure. Based on the corresponding extent of overexposure and underexposure at the identified regions, the processor or a control device may operate the SLM to non-uniformly modulate light emitted onto different regions of the scene. For example, the SLM may be controlled to provide greater attenuation to regions of overexposure, and less or no attenuation to regions of underexposure. Furthermore, a processor or control device may control other aspects of the image sensor or camera, such as the exposure time, shutter speed, or other tunable camera controls. Once the SLM has been adjusted, the image sensor may capture a second image. The second image may be characterized by a lower dynamic range than the first image and may reduce the extent of overexposure and underexposure of portions of the environment represented within the second image.

In any of the implementations disclosed herein, a depth-sensing system may include a processor or computing device configured to analyze image data and generate depth maps. Such a processor or computing device may include memory on which program instructions are stored, which upon execution carries out a depth map generating process. Such instructions may include known constants or configurations of the depth-sensing system (e.g., for a stereo imaging system, the relative positions of each image sensor). It should be understood that various depth map generation techniques may be used in combination with the light modulation techniques disclosed herein, without departing from the scope of the present application.

In the above-described static filter implementations, a depth-sensing apparatus or system may be repositionable or otherwise movable, such that an image sensor's position and orientation relative to a given surface within the environment may be changed, adjusted, or otherwise controlled. For example, the depth-sensing apparatus may be coupled with a mechanical or robotic device capable of moving about within an environment or may be included in an augmented reality device (e.g., headset). In such circumstances, the depth-sensing apparatus may be positioned or oriented to place nearby surfaces within a particular region of the image sensor's field-of-view, and distant surfaces in another region of the image sensor's field-of-view. For example, the image sensor may be placed such that nearby surfaces are in a center portion of the image, while distant surfaces are in left or right portions (or more generally, outside of the center portion) of the image. In some static filter or mask implementations, those image regions may correspond to respective filter regions. In the above example, the central region may correspond to a filter region of greater attenuation compared to left or right regions, such that light from nearby surfaces is attenuated more than light from distance surfaces.

Thus, in such static filter implementations, the configuration or properties of a non-active optical filter may depend on the particular use or known operation of depth-sensing system within a larger system. In some cases, nearby surfaces may be expected to be within the left, right, top, or bottom portions of an image; the nearby surfaces may lie within a square, rectangular, circular, oval, or another shaped region; the nearby surfaces may take up small or large region(s) of the image; and there may be multiple regions in which nearby surfaces are expected. Although some example filter configurations are explicitly described herein, it should be understood that any filter configuration may be used without departing from the scope of the present application.

Furthermore, although the above-described examples specify "nearby" and "distant" surfaces, a depth-sensing system may be used in an environment containing three or more distinct categorizations of surface distances relative to the image sensor. Examples described herein that refer to "nearby" and "distant" surfaces are provided for explanatory purposes. However, it should be understood that a filter having any number of regions may be used without departing from the scope of the present application.

As described herein, "intensity," "brightness," "luminance," and "illuminance" generally refer to the amplitude, intensity, power, or energy of a light ray, beam, wave, photon(s), or any combination thereof. In general, the terms above may refer to the amplitude of light per unit area over a given duration of time (i.e., "flux"). The total luminous flux for a unit area on a surface may be referred to as the "illuminance," while the total luminous flux reflected or emitted from a unit surface area may be referred to as the "luminance exitance." As an example, incident light on an image sensor emitted by or reflected off an object (e.g., illuminance or luminous exitance) may be collected at a photodetector of the image sensor over a set period of time (e.g., exposure time), which accumulates as a charge of a particular amplitude. Once processed, that charge may be measured and converted into pixel data, including a digital value representative of the amplitude of the charge. When displayed on a display device, pixels with greater charge amplitudes may appear "brighter" compared to pixels with lower charge amplitudes.

As another example, an optical filter may contain materials that absorb or scatter a portion of light incident on the filter. As a result, the illuminance of light incident on the optical filter may be greater than the luminance exitance of light passing through the opposite side of the optical filter. Thus, the luminance exitance of light reflecting off surfaces within an environment may be attenuated or modulated via an optical filter (e.g., a neutral density filter). When placed over an image sensor, the optical filter may thereby affect the apparent brightness of surfaces in a captured image. For the purposes of the present application, it should be understood that any term used to describe the intensity or amplitude of light, such as those provided above, may be used interchangeably.

II. Example Systems

FIG. 1 illustrates an example configuration of a system that may be used in connection or combination with the example implementations described herein. System 100 may be an electromechanical system such as, for example, a robotic device or a vehicle, among a number of other possible implementations. System 100 may be referred to as a robotic device, robotic manipulator, or robot, among others. However, the example devices, apparatuses, filters, and operations thereof herein described may also be used independently of system 100.

The system 100 is shown to include processor(s) 102, data storage 104, program instructions 106, controller 108, sensor(s) 110, power source(s) 112, actuator(s) 114, and movable component(s) 116. Note that the system 100 is shown for illustration purposes only as system 100 may include additional components and/or have one or more components removed without departing from the scope of the invention. Further, note that the various components of system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The system 100 may include one or more sensor(s) 110 such as force sensors, proximity sensors, motion sensors, load sensors, position sensors, touch sensors, ultrasonic range sensors, visible light image sensors, and infrared sensors, among other possibilities. The sensor(s) 110 may provide sensor data to the processor(s) 102 to allow for appropriate interaction of the system 100 with the environment. Additionally, the sensor data may be used in evaluation of various factors for providing feedback as further discussed below. In one example, sensor(s) 110 may include one or more image sensors positioned at a fixed distance relative to a structured light projector 118 (discussed below). The one or more image sensors may be configured to sense light in the range of wavelengths projected by projector 118. Data from the image sensors may be used to determine, based on a pattern of light projected by projector 118, depth estimates between the projector and various objector or surfaces/features thereof within the environment.

Further, the system 100 may also include one or more power source(s) 112 configured to supply power to various components of the system 100. Any type of power source may be used such as, for example, a gasoline engine or a battery.

The system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the system 100). In other cases, an actuator may be a linear actuator that may be used in systems involving straight line motion.

In either case, actuator(s) 114 may cause movement of various movable component(s) 116 of the system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the system 100 and may be configured to receive input from a user, such as via a graphical user interface. This computing system may be incorporated within the system 100 or may be an external computing system that is capable of (wired or wireless) communication with the system 100. As such, the system 100 may receive information and instructions, such as based on user-input at the graphical user interface and/or based on user-input received via press of buttons (or tactile input) on the system 100, among other possibilities.

A system 100 may take on various forms, such as a robotic device with some combination of actuators, controllers, sensors, end effectors, and/or other robotic components. In some instances, the system 100 may include a combination of elements—such as image sensor(s) 110, light projector(s) 118, and filter(s) 120—that collectively form a depth-sensing subsystem.

In particular, light projector(s) 118 may be configured to project structured light in a range of wavelengths that the image sensor 110 is configured to sense. Thus, as discussed above, data from the image sensor(s) 110 may be used to estimate the distance between projector(s) 118 and objects within the environment of system 100. Filter(s) 120 may be situated along an optical path between projector(s) 118 and image sensor(s) 110 to filter an intensity of light projected by projector(s) 118 and incident on image sensor(s) 110. Filter(s) 120 may be used to spatially and/or temporally control the range of light intensities projected and/or sensed by the depth-sensing subsystem to improve the dynamic range of the depth-sensing subsystem. The example depth-sensing implementations and operations disclosed herein may be incorporated within a robotic system (e.g., system 100) or the like in order to carry out depth sensing as a part of the robotic system's operation.

Alternatively, components of system 100 may represent an imaging system used for purposes other than depth sensing. For example, the combination of image sensor(s) 110, projector(s) 118, and filter(s) 120 may be used to implement a dynamic illumination system for flash photography or videography. For example, filter(s) 120 may be used to modulate the intensity of light projected by projector(s) 118, based on image data from image sensor(s) 110, to modulate the illumination of different portions of a scene based on exposures of objects within the scene. Thus, sensor(s) 110, projector(s) 118, and filter(s) 120 may be used in combination to improve the dynamic range of image data captured by image sensor(s) 110. Other arrangements are also possible.

III. Example Depth Sensing Systems

Figure 2:
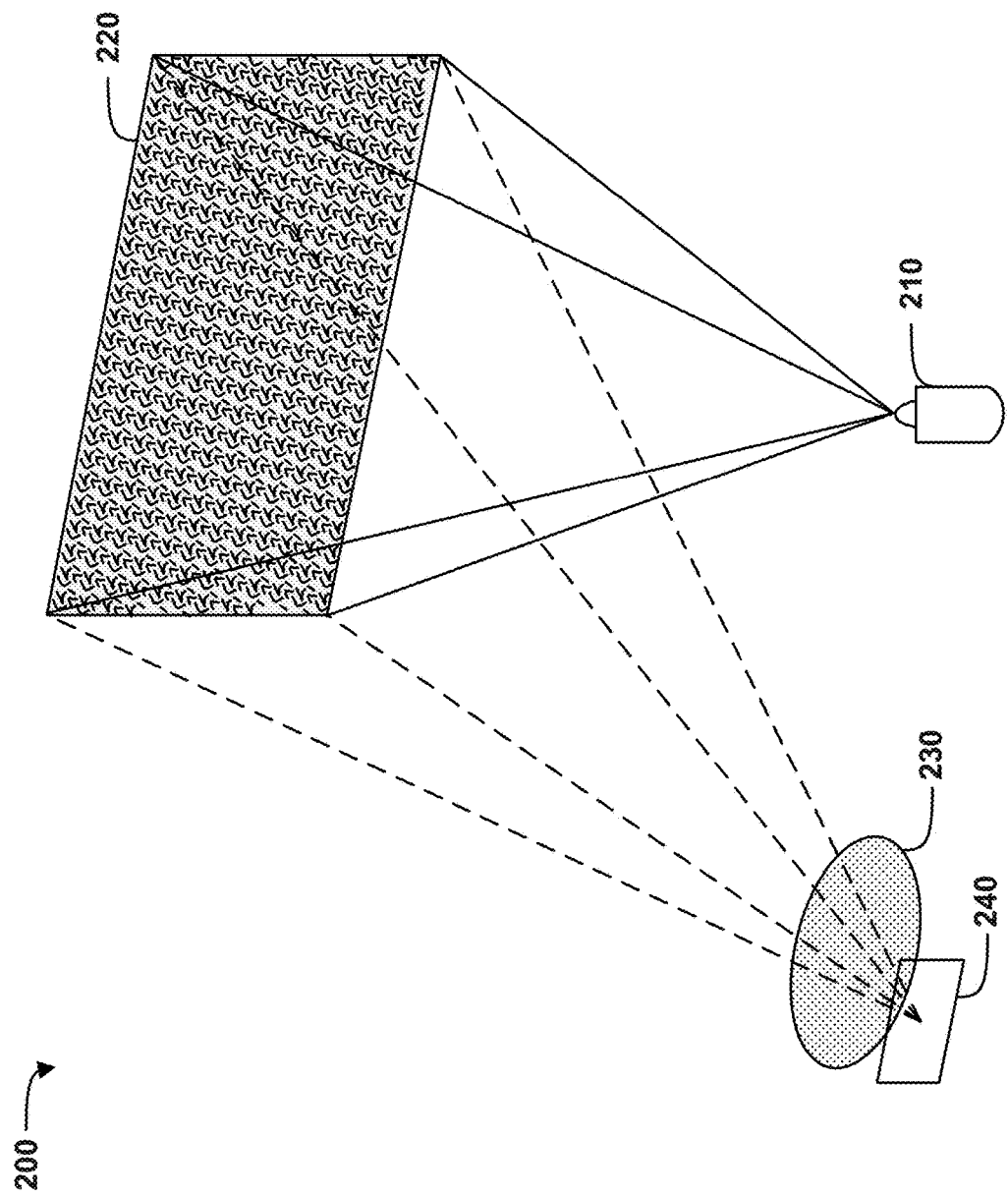
FIG. 2 illustrates a perspective view of a patterned light imaging system, according to an example implementation.

An imaging or depth-sensing system may capture images of patterned light projected onto objects and/or surfaces within an environment. FIG. 2 illustrates a perspective view 200 of an example scenario in which such a depth-sensing system is used for imaging an environment. In FIG. 2, a patterned light projector 210 illuminates the environment 220 with patterned light. Some of that patterned light reflects off the environment 220, passes through filter 230, and is captured at image sensor 240.

In some instances, the patterned light may be infrared light of a particular wavelength or band of wavelengths. In other instances, the patterned light may be light with wavelengths within the visible spectrum. Regardless of the implementation, the patterned light may be received at and captured by the image sensor 240. The patterned light may be structured to include therein features and patterns that can be recognized within the capture images to triangulate the distance between environment 220 and image sensor 240 and/or environment 220 and patterned light projector 210.

As described herein, an "environment" may refer to a portion of an environment that is within the field-of-view of an image sensor. As such, an environment may include additional objects or surfaces beyond a particular field-of-view. In some implementations, components such as the image sensor and the patterned light projector may be movable (e.g., coupled to a robotic device or to an augmented reality device worn by a person) such that the field-of-view of the image sensor changes. To simplify the description and explanation of implementations of the present application, the term "environment" may refer to a portion of an environment or scene that is within the field-of-view of an image sensor at a particular point in time. However, it should be understood that the viewable portion of the environment may change during the course of operation of an imaging system or depth-sensing system.

Additionally, although FIG. 2 depicts filter 230 as being situated between the image sensor 240 and the environment 220, the filter 230 or an additional filter may be placed between the projector 210 and the environment 220. In one example embodiment, filter 230 may be situated between an illumination element of projector 210 and environment 220. Specifically, filter 230 may be situated between the illumination source (i.e., light source) of projector 210 and a patterned screen (e.g., GOBO, diffractive screen etc.) through which light from the illumination element is projected to generate a structured light pattern. In alternative embodiments, filter 230 may be situated between the patterned screen and environment 230. Further, in some embodiments, two or more filters may be used (e.g., at least one filter between the illumination source and the patterned screen and at least one filter between the patterned screen and environment 220. Accordingly, an otherwise uniform brightness patterned light projection may be partially modulated or attenuated before the patterned light illuminates the environment 220, after the patterned light reflects off the environment 220, or both.

In some examples, an imaging or depth sensing system may include more than one image sensor. For instance, a stereo depth-sensing system may include two image sensors, spaced apart at some distance such that each image sensor observes the environment from different perspectives. Depth may be determined via triangulation based on the distance between the two image sensors and representations of corresponding features between image data captured by the two sensors. Furthermore, some examples may include one or more image sensors dedicated to detecting light within a particular wavelength band (e.g., infrared) while other image sensors are used to capture light within other wavelength bands (e.g., red, green, blue, or other visible light colors). One example set of image sensors includes two infrared image sensors and an additional RGB image sensor, which collectively forms an RGB-Depth (RGB-D) sensor. An example RGB-D sensor may be able to resolve depth of objects positioned between several centimeters to several meters away from the RGB-D sensor.

Figure 3:
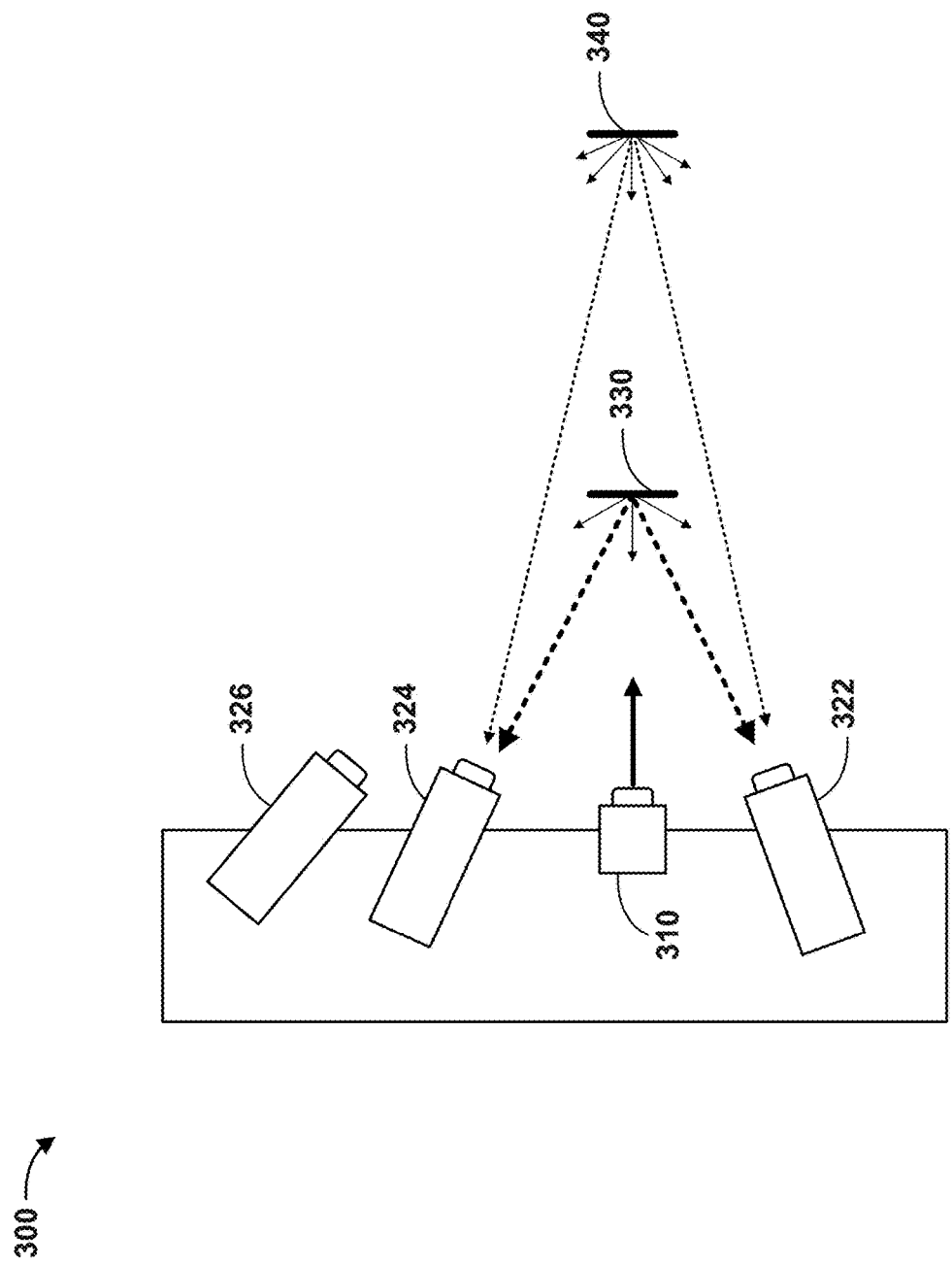
FIG. 3 illustrates a schematic diagram of a stereo system, according to an example implementation.

Although FIG. 2 depicts environment 220 at a particular uniform distance from the image sensor 240, other environments may include multiple objects or surfaces at varying distances from image sensor 240 and/or patterned light projector 210. In FIG. 3, an RGB-D sensor formed from image sensors 322, 324, and 326 are arranged to capture light reflected off surfaces 330 and 340. In the top-down view 300 of FIG. 3, a patterned light projector 310 emits light toward surfaces 330 and 340. Due to the properties of light, the nearby surface 330 reflects a greater portion of light toward sensors 322 and 324 compared to the amount of light reflected off the distant surface 340.

In particular, with the patterned light projected with a uniform brightness and no filtering of the projected patterned light, the image sensors 322 and 324 may collect, over a given period of time, more light reflecting off nearby surface 330 than from distant surface 340. The resulting image may in turn depict nearby surface 330 as appearing brighter than the distant surface. In some cases, too much light collected from nearby surface 330 may cause it to appear overexposed, possibly rendering the projected pattern undiscernible in the resulting image. Likewise, too little light collected from distant surface 340 may cause it to appear underexposed, possibly rendering the projected pattern too faint to detect in the resulting image. When the projected pattern is undiscernible, the RGB-D sensor might not be able to estimate the distance between the RGB-D sensor and the respective surfaces 330 and 340. In some instances, an exposure time long enough to prevent underexposure of distant surface 340 and short enough to prevent overexposure of nearby surface 330 might not be available.

Figure 4:
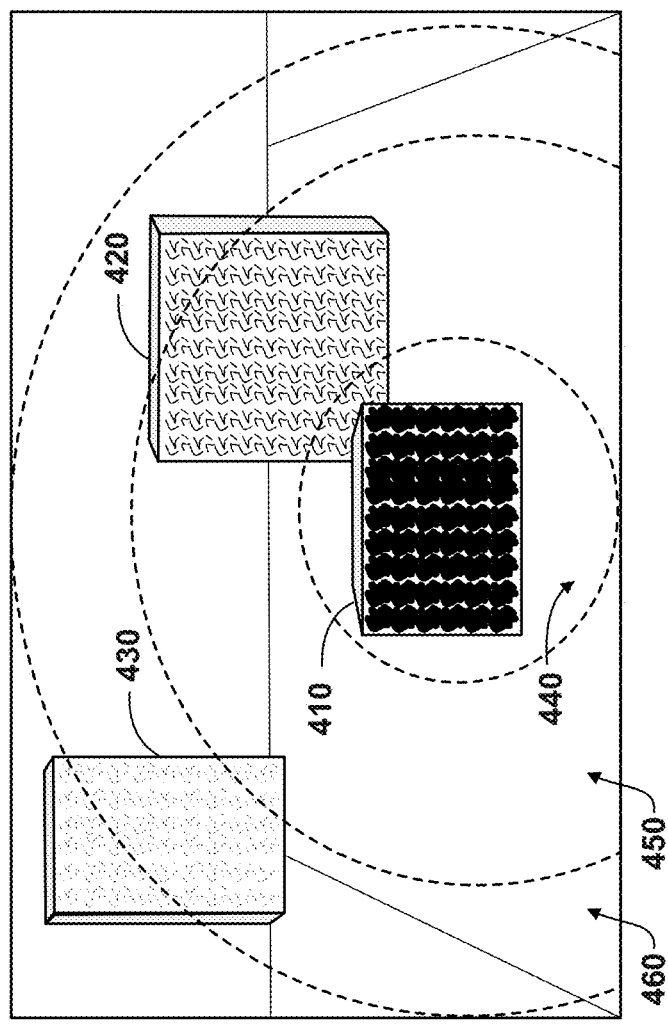
FIG. 4 illustrates an example image of an environment illuminated by patterned light, according to an example implementation.

FIG. 4 illustrates an example image 400 of an environment with surfaces 410, 420, and 430, each of which is at a different distance from the image sensor. As shown in image 400, the projected pattern on the nearby surface 410 is overexposed, such that the pattern itself is difficult to distinguish. Additionally, the projected pattern on distant surface 430 is faint and thus also difficult to distinguish. The medium-distance surface 420, however, is adequately exposed, and the projected pattern is clearly discernible in the image 400.

FIG. 4 also illustrates an example division of image 400 into regions within which the surfaces 410, 420, and 430 at least partially lie. In this example, surface 410 lies within region 440, the majority of surface 420 lies within region 450, and a large portion of surface 430 lies within region 460. In some implementations, an optical filter may be designed with regions corresponding to the regions 440, 450, and 460. The optical filter may be placed in front of the image sensor or the patterned light projector. Such a filter may, for example, attenuate the intensity of light within region 440 by a greater amount compared to region 450. Further, the amount of attenuation through the portion of the filter corresponding to region 450 may be greater than the region 460.

Such a "graduated" filter may therefore be arranged, formed, or otherwise constructed to correspond with respective regions of an image in which surfaces of particular distances are expected. For example, in many robotics and augmented reality applications relying on depth sensing, nearby objects may commonly be located in or near the center of the field of view of the image sensor. Although the relative distances of objects may vary across different scenarios, an image sensor's field-of-view may be altered (e.g., by repositioning and/or reorienting the sensor) to compose a scene in which nearby surfaces lie within the center of the image, medium-distance surfaces lie around that central region, and distant surfaces are near the edges of the image.

The field of view may be altered by, for example, a robotic device controlling the position and/or orientation of an imaging device. In particular, image data captured by the image sensor may be used to identify objects or surfaces within the environment that are overexposed and/or underexposed. A trajectory may be determined through which to move the depth sensor to place the respective objects or surfaces within corresponding regions of the filter (e.g., overexposed objects in region 440 and underexposed objects in region 460).

IV. Example Filter Configurations

As described above, a filter, mask, or other light modulator may be configured, arranged, formed, or otherwise constructed to non-uniformly attenuate or modulate the intensity of light passing through it. The filter, mask, or light modulator may include different regions configured to attenuate the intensity of light to different extents. As described herein, the non-uniformity of such filters may be referred to as "graduated." It should therefore be understood that "graduated filter" generally refers to any apparatus that non-uniformly modulates the intensity of light passing through it, and is not limited to one particular arrangement or filter configuration.

Figure 5B:
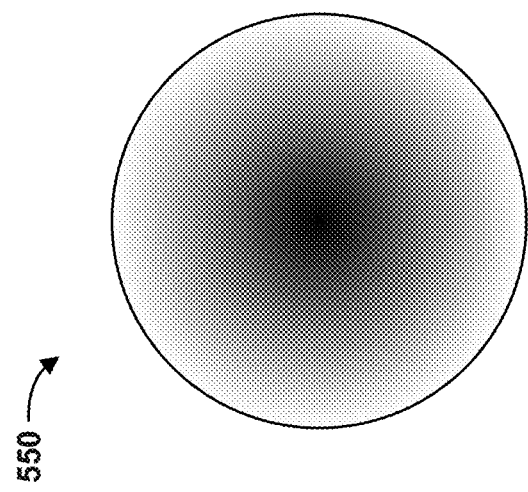
FIG. 5A and FIG. 5B illustrate example optical filters, according to an example implementation.
Figure 5A:
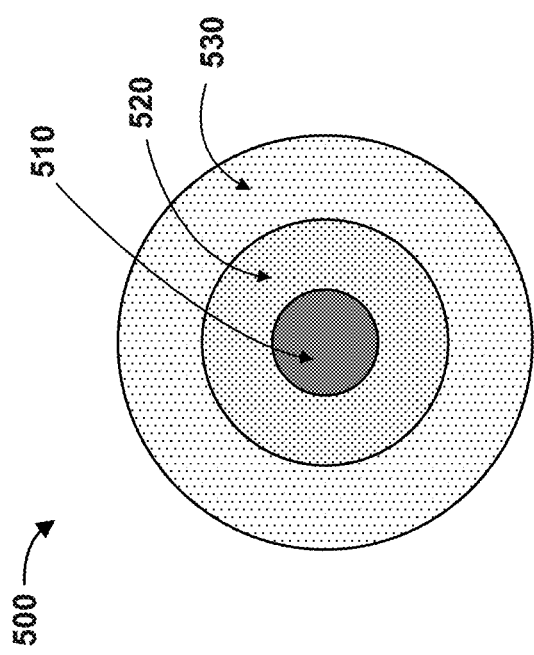

FIGS. 5A and 5B depict example graduated filters that may be used in imaging and depth-sensing systems of the present application. In FIG. 5A, stepwise filter 500 includes three discrete regions 510, 520, and 530 (in order of decreasing amounts of light intensity attenuation). In FIG. 5B, smooth filter 550 includes no discrete regions, but rather continuously varies the amount of attenuation or filtering from one attenuation level at the center to another attenuation level at the edges of the smooth filter 550. The amount of light attenuation for a particular region or location on a filter may vary from 100% (all light blocked) to 0% (no light filtering or intensity attenuation).

In some applications, use of filters 500 and 550 in a depth-sensing apparatus or system may rely on a tendency of nearby objects to be located near the center of the field of view of the image sensor, as illustrated in FIG. 4. This tendency may be most prominent in application such as, for example, robotics. Thus, filters 500 and 550 may be structured to include at or near the center of the respective filters a region that attenuates light intensity to a larger extent than any other region in the respective filter. Additionally, regions near the circumference of filters 500 and 550 may attenuate light intensity to a smaller extent than any other region in the respective filter.

Although not explicitly illustrated, a filter may include a combination of discrete regions and smooth transitions between those regions. Furthermore, any number of regions, any pattern of regions, and any transition between those regions may be used without departing from the scope of the present application. For example, although filters 500 and 550 are illustrated as symmetric about the center of the circle, alternative implementations might be symmetric about a horizontal or vertical axis bisecting filters 500 and/or 550. In some instances, the filter pattern may be asymmetric and/or irregular. The number and pattern of the regions may be selected based on the application of the depth sensor and/or the expected pattern of objects within an environment where the sensor is to be used. For example, when objects observed by the bottom half of the image sensor are expected to be closer to the sensor than objects observed by the top half of the image sensor, the bottom of the filter may be formed as a high attenuation region and the top of the filter may be formed as a low attenuation region.

Some filters may be formed from materials or otherwise be configured to filter light of a particular wavelength, one or more wavelength bands, or all wavelengths of light. For instance, some filters may filter wavelengths of light corresponding to the wavelengths of the patterned light emitted by a projector onto an environment. Other filters may be configured or otherwise formed to attenuate all wavelengths of light (e.g., a neutral density (ND) filter). Various types of filtering apparatuses may be used, depending on the specific implementation.

An imager may include an array of "pixels"—or individual photodetectors—that operate by generating a charge when photons are incident thereon. Some imagers may include a photodetector array coupled with an array of optical filters. For example, an imager may include a repeating 2×2 array of filters that pass through red, green, green, and blue (RGGB, i.e., a Bayer filter) respectively. In some implementations described herein, the non-uniform filter may be integrated within or otherwise be formed as a pixel-coupled optical filter array. That is, the non-uniform filter may be included on the imager during the manufacturing process of the imager. Thus, some imaging systems or depth-sensing systems of the present application may include multiple filters over each photodetector of the system (e.g., a filter array coupled to the photodetectors, and a non-uniform filters for improved dynamic range).

Alternatively, in some implementations, the non-uniform filters described herein may be separate from an imaging device or patterned light projector. For example, the non-uniform filter may be arranged or situated between the photodetector array and the environment (e.g., behind or in front of a lens that focuses light onto the photodetector array). Arrangements that include the non-uniform filters as separate components may benefit from increased interchangeability of the filters that many be tailored to many different applications.

Within examples, a graduated filter may be implemented as a static filter with a fixed attenuation pattern across the area of the filter (e.g., filter 500 with regions 510, 520, and 530). Thus, the depth sensor may need to be repositioned or reoriented to position nearby objects in the high-attenuation filter region and distant objects in the low-attenuation filter region.

Alternatively, the graduated filter may be implemented as a dynamic filter where the attenuation pattern across the area of the filter is controllable by electrical signals. For example, a spatial light modulator such as a liquid crystal on silicon (LCoS) spatial light modulator may be used to modulate the intensity of light across the area of the filter by controlling size or opacity, among other possibilities, of gaps, apertures, or pixels defining the structured light pattern. Thus, the attenuation pattern across the area of the filter may be adjusted based on the level of exposure of portions of an image representing respective objects or surfaces within the environment. Notably, by using an active, dynamic filter such as a spatial light modulator, a uniform intensity of the structured light pattern reflection incident on the image sensor may be achieved without moving the sensor to position objects or surfaces within particular regions of the filter or sensor. Instead, the intensity of portions of the emitted light pattern may be modulated directly to achieve the desired exposure within different regions of the field of view of the imager.

In addition to optical filters, a light modulator may take the form of a mask. A mask may be any object or apparatus that partially blocks or obstructs light passing through a particular area. Some masks may be formed of metal, plastic, or another substantially opaque material, and include one or more gaps, slots, spaces, patterned features, or regions containing transparent or translucent material. The substantially opaque mask may include thereon transparent patterned features (e.g., GOBO-style mask). Light may pass through the transparent patterned features, but not the substantially opaque regions, to define a structured light pattern.

In some implementations, the size or dimensions of a mask's patterned features may vary across an optical mask. For example, FIG. 6A illustrates an optical mask 600 in which the mask pattern feature size increases radially outward. At the center of optical mask 600, the feature size is comparatively "thinner" than the feature size at the outside edges of the optical mask 600. In this manner, more light passes through the optical mask 600 at the edges than at its center. Notably, although the opening size defining each pattern feature may vary spatially, the spatial frequency of the pattern features (e.g., the spacing between the centers of adjacent pattern features) may be uniform across the area of the mask.

Placing an optical mask such as optical mask 600 over a light source or projector may produce patterned light having non-uniform light intensity. Due to the smaller feature size, the center of mask 600 may produce a pattern having a lower intensity than regions near the circumference of mask 600. Such non-uniform patterned light may provide a different amount of illumination across surfaces in an environment. In some circumstances, the patterned light may illuminate nearby surfaces less than distant surfaces (e.g., when nearby surfaces are positioned near the center of mask 600), such that the reflected light captured by an image sensor has a narrower dynamic range (compared to uniform-intensity illumination).

In some embodiments, the light projector and the mask 600 may be rotated and/or translated (e.g., along with the image sensor) to keep nearby surfaces within or near the center of mask 600 (lower light intensity) and distant surfaces near the outer limits (e.g., not within or near the center) of mask 600. For example, a control system may be configured to determine that a nearby surface is located to the left of the center of mask 600 based on, for example, determining that the image of the structured light pattern on the nearby surface is overexposed and thus cannot be discerned. Accordingly, the light projector and the mask may be panned left to bring the nearby surface closer to the center of mask 600 such that the light pattern projected onto the surface will be attenuated to a greater extent, reducing exposure of the image of the structured light pattern projected onto the nearby surface, and making the pattern more discernable. Thus, the images of the reflections of the projected light pattern may have a lower dynamic range, providing for more accurate distance estimates to objects within the environment.

Alternatively, the pattern features of mask 600 may be defined using active elements (e.g., a spatial light modulator). Accordingly, the intensity of light projected through each pattern feature of mask 600 may be dynamically varied. For example, the opening size or opening opacity of the pattern elements of mask 600 may be modulated based on exposures of and/or distances to various objects or surfaces represented within an image of a particular portion of the environment.

Figure 6B:
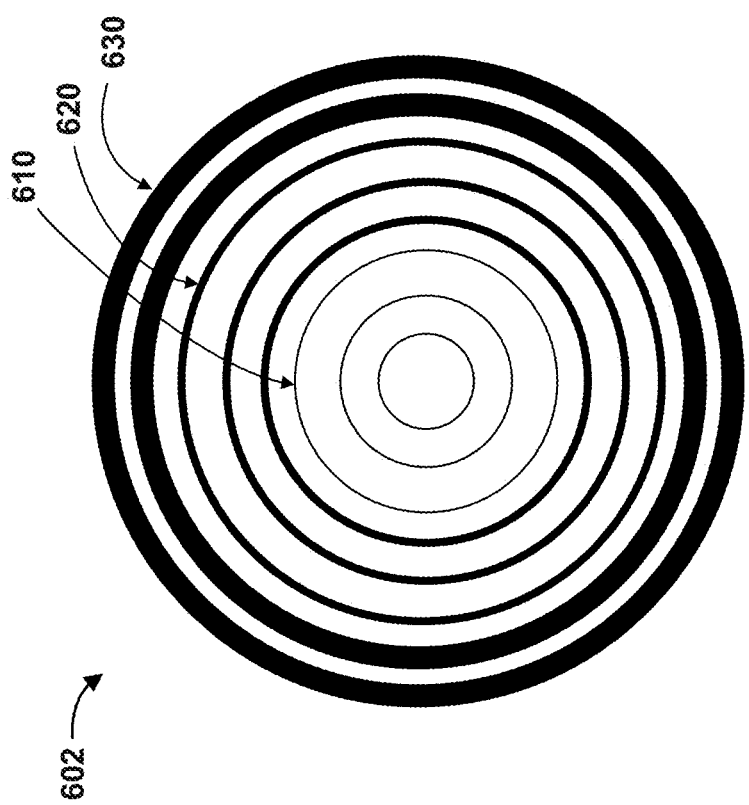
FIG. 6B illustrates an example optical mask, according to an example implementation.
Figure 6A:
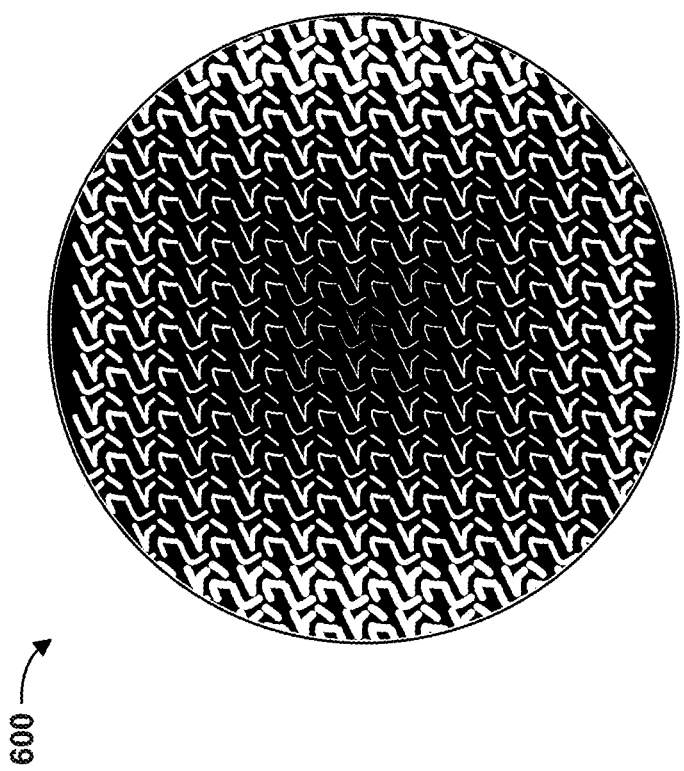
FIG. 6A illustrates an example optical mask, according to an example implementation.

FIG. 6B illustrates an additional example mask 602 that may be used to generate a structured light pattern with spatially-varying intensity. In particular, mask 602 may be a diffractive mask where the diffraction pattern of light incident on the mask forms the structured light pattern. The spatial intensity of the light passing through mask 602 may be varied due to the slit size of the diffractive mask increasing radially outwards. In particular, slits 630 (i.e., the two outermost slits) may be larger than slits 620. Slits 620 may in turn be larger than slits 610 (i.e., the three innermost slits). Thus, slits 610, 620, and 630 of mask 602 may form three regions, each having a different emitted light intensity, much like filter 500 shown in FIG. 5A.

Implementations described herein may utilize an optical filter (e.g., a neutral density filter), an optical mask, another type of light modulator, or some combination thereof. It should be understood that the type and/or combination of light modulators used may vary depending on the particular system. Regardless of the specific implementation, a light modulator—such as an optical filter or optical mask—may be used to modulate or attenuate the amount of light passing through a particular region or area.

V. Example Methods

Figure 7:
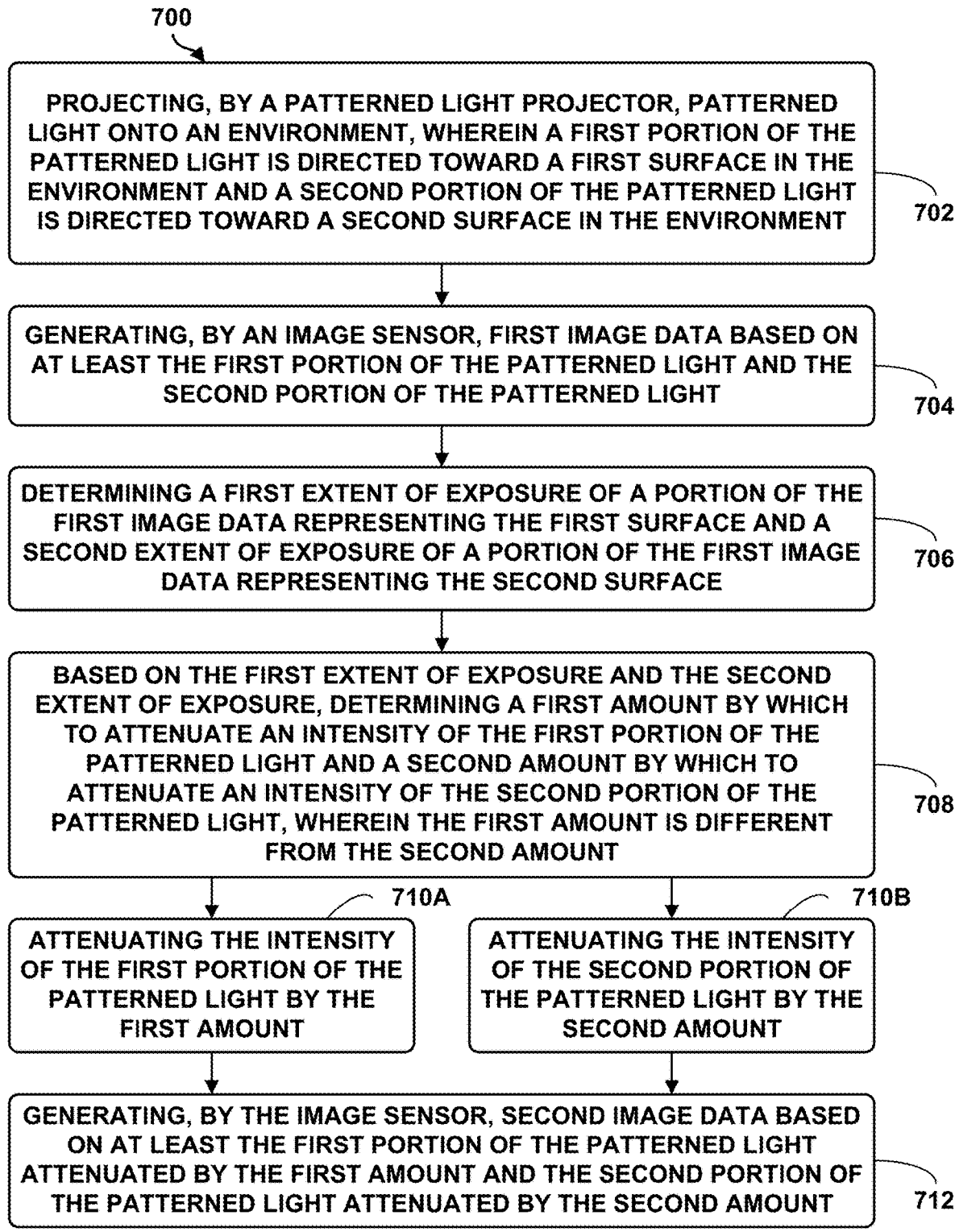
FIG. 7 is a flowchart illustrating a method, according to an example implementation.

FIG. 7 is a flowchart of operations 700 for determining an amount by which to attenuate light projected at portions of an environment, according to an example implementation. Operations 700 shown in FIG. 7 present an implementation that could be used by computing devices or control systems. Operations 700 may include one or more actions as illustrated by blocks 702-712. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 700 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device. In addition, one or more blocks in FIG. 7 may represent circuitry that is wired to perform the specific logical operations.

In block 702, patterned light may be projected onto an environment by a patterned light projector. A first portion of the patterned light may be directed toward a first surface in the environment and a second portion of the patterned light may be directed toward a second surface in the environment.

In some instances, the patterned light projector may be part of a depth-sensing device configured to determine a distance between the light projector and various objects and surfaces within the environment. For example, in some instances, the first surface may be at a first distance from the patterned light projector and the second surface may be at a second distance from the patterned light projector. The first distance and the second distance may be different. Thus, the patterned light projected by the patterned light projector may be used to determine first and second values indicative of estimates of the first and second distance, respectively. However, the light pattern may also be projected as part of operations other than depth measurements. For example, the patterned light may be a spatially modulated camera flash configured to project light of higher intensity onto distant objects and light of lower intensity onto nearby objects to achieve uniform scene illumination during image capture.

In block 704, first image data may be generated by an image sensor based on at least the first portion of the patterned light and the second portion of the patterned light. When the patterned light projector is part of a depth sensing device, the image sensor may be positioned at a known distance from the patterned light projector to allow for depth estimation based on triangulation. The image sensor may be configured to sense light in at least the wavelength or range of wavelengths of the patterned light (e.g., a portion of the infrared spectrum).

In block 706, a first extent of exposure of a portion of the first image data representing the first surface and a second extent of exposure of a portion of the first image data representing the second surface may be determined. The first and second extents of exposure may represent image exposure responsive to reflections of the first and second portions of the patterned light, respectively, from the first and second surfaces, respectively.

In block 708, a first amount by which to attenuate an intensity of the first portion of the patterned light and a second amount by which to attenuate an intensity of the second portion of the patterned light may be determined based on the first extent of exposure and the second extent of exposure. The first amount may be different from the second amount. In one embodiment, the first and second amounts may be proportional to the first and second extents of exposure, respectively. For instance, when the portion of the first image data representing the first surface is exposed twice as much as the portion of the first image data representing the second surface, the first amount may be equal to twice the second amount. Alternatively or additionally, when either portion of the first image data is underexposed or overexposed, the amount of attenuation may be increased or decreased beyond the proportional amount to bring the respective image portion into the image sensor's dynamic range.

In block 710A, the intensity of the first portion of the patterned light may be attenuated by the first amount. In block 710B, the intensity of the second portion of the patterned light may be attenuated by the second amount. In some embodiments, the operations of blocks 710A and 710B may be performed in parallel.

In one example, intensity of the light may be attenuated by the first and second amounts using a spatial light modulator. Specifically, the spatial light modulator may be controlled to attenuate an intensity of light passing through a first portion of the spatial light modulator by the first amount and to attenuate an intensity of light passing through a second portion of the spatial light modulator by the second amount. For example, a size or opacity of features (e.g., apertures or pixels) through which the light is passed (e.g., from which light is emitted) may be controlled to modulate the light intensity. The first and second portions of the patterned light may then be passed through the respective portions of the spatial light modulator and be attenuated by the respective amounts.

In another example, the intensity of light may be attenuated by the first and second amounts by a graduated optical filter. In particular, the first portion of the patterned light may be passed through a first region of the graduated optical filter and the second portion of the patterned light may be passed through a second region of the graduated optical filter. The first and second portions may attenuate the patterned light by the first and second amounts, respectively. In some examples, the amount of attenuation may be controlled by repositioning one or more graduate optical filters with respect to the patterned light projector. For example, the first portion of the patterned light may be attenuated by the first amount by moving the projector and/or the graduated optical filter to pass the first portion of the patterned light through the first region of the graduated optical filter configured to attenuate light by the first amount. Alternatively or additionally, two filters may be combined (e.g., repositioned with respect to one another) to achieve the first amount of attenuation over the first portion of the patterned light.

In block 712, second image data may be generated by the image sensor based on at least the first portion of the patterned light attenuated by the first amount and the second portion of the patterned light attenuated by the second amount The second image data may include a lower dynamic range between the portions of image data representing the first and second surfaces due to the attenuation of the projected patterned light in steps 710A and 710B.

In some embodiments, the adjustment of the first and second attenuation values may be repeated to continuously refine the dynamic range between image portions representing one or more surfaces or objects. Specifically, the operations of blocks 706-712 may be repeatedly performed on additional images. For example, as the sensor (i.e., the light projector and the image sensor) moves relative to features of the environment, the first and second attenuation values may be adjusted to maintain within an acceptable threshold a dynamic range between images of different surfaces within the environment.

In one embodiment, as discussed above, the operations of flow diagram 700 may be performed by or on behalf of a depth sensing device or system. The depth sensing device or system may use the first and second image data, generated in blocks 704 and 712, respectively, to determine a first value indicative of an estimate of a first distance between the first surface and the patterned light projector and a second value indicative of an estimate of a second distance between the second surface and the patterned light projector. Attenuation of the respective portions of the patterned light may allow for reflections of the respective portions of the patterned light to be more easily and clearly discernable in the captured images. In particular, attenuation may prevent the reflections of the respective portions of the patterned light from overexposing or underexposing the image sensor. Thus, accurate estimates of the first and second distances may be determined.

VI. Example Computer-Readable Medium

FIG. 8 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 8 is a schematic illustrating a conceptual partial view of a computer program product that includes a computer program for executing a computer process on a computing device, arranged according to at least some implementations disclosed herein.

In some implementations, the example computer program product 800 may include one or more program instructions 802 that, when executed by one or more processors may provide functionality or portions of the functionality described above with respect to FIGS. 1-7. In some examples, the computer program product 800 may include a computer-readable medium 804, such as, but not limited to, a hard disk drive, a Compact Disc (CD), a Digital Video Disk (DVD), a digital tape, memory, etc. In some implementations, the computer program product 800 may include a computer recordable medium 806, such as, but not limited to, memory, read/write (R/W) CDs, R/W DVDs, etc.

The one or more program instructions 802 can be, for example, computer executable and/or logic implemented instructions. In some examples, a computing device is configured to provide various operations, or actions in response to the program instructions 802 conveyed to the computing device by the computer readable medium 804 and/or the computer recordable medium 806. In other examples, the computing device can be an external device in communication with a device coupled to the robotic device.

The computer readable medium 804 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 800 can implement operations discussed in reference to FIGS. 1-7.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
    a patterned light projector comprising a light source and a mask situated between the light source and an environment, wherein the patterned light projector is operable to project (i) a first portion of patterned light onto a first surface in the environment and (ii) a second portion of the patterned light onto a second surface in the environment, wherein the first portion of the patterned light is generated by a first set of gaps located in a first region of the mask and configured to modulate the first portion of the patterned light to have a first intensity, wherein the second portion of the patterned light is generated by a second set of gaps located in a second region of the mask and configured to modulate the second portion of the patterned light to have a second intensity, and wherein a second size of the second set of gaps is greater than a first size of the first set of gaps such that the second intensity is greater than the first intensity;
    at least one image sensor operable to generate image data representing the environment, wherein at least some of the image data represents the environment illuminated by the first portion of the patterned light and the second portion of the patterned light; and
    a control system configured to:
        identify, based on the image data, an object of interest within the environment; and
        based on identifying the object, cause repositioning of the patterned light projector such that the first portion of the patterned light is directed onto the object.
2. The system of claim 1, wherein the second region of the mask surrounds and is coplanar with the first region of the mask.
3. The system of claim 1, wherein the control system is further configured to:
    determine, based on the image data, that the object is illuminated by the second portion of the patterned light; and
    cause the repositioning of the patterned light projector further based on determining that the object is illuminated by the second portion of the patterned light.
4. The system of claim 1, wherein the control system is further configured to:
    determine an extent of exposure of a portion of the image data that represents the object; and
    based additionally on the extent of exposure, cause the repositioning of the patterned light projector such that the first portion of the patterned light is directed onto the object.
5. The system of claim 1, wherein the control system is further configured to:
    determine, based on the image data, a value indicative of a distance between the object and the patterned light projector; and
    based additionally on the value indicative of the distance, cause the repositioning of the patterned light projector such that the first portion of the patterned light is directed onto the object.
6. The system of claim 1, further comprising:
    a robotic device, wherein the control system is further configured to:
        cause the at least one image sensor to generate additional image data representing the object illuminated by the first portion of the patterned light; and
        cause the robotic device to navigate through the environment based on the additional image data.
7. The system of claim 1, wherein the image data comprises (i) red-green-blue (RGB) image data and (ii) infrared (IR) image data, and wherein the patterned light comprises IR light.
8. The system of claim 7, wherein the control system is configured to identify the object of interest based on the RGB image data.
9. The system of claim 1, wherein the at least one image sensor comprises a first image sensor and a second image sensor, wherein the image data comprises first image data generated by the first image sensor and second image data generated by the second image sensor, wherein the first image data and the second image data each represent the environment illuminated by the first portion of the patterned light and the second portion of the patterned light, and wherein the control system is further configured to:
    identify the object of interest based on corresponding features between the first image data and the second image data.
10. The system of claim 1, wherein the mask comprises an opaque material, and wherein the first set of gaps and the second set of gaps each comprise a respective set of transparent regions arranged to define a pattern of the patterned light.
11. The system of claim 1, wherein the first set of gaps comprise a first set of diffractive optical elements, and wherein the second set of gaps comprises a second set of diffractive optical elements.
12. A method comprising:
    projecting, by a patterned light projector, (i) a first portion of patterned light onto a first surface in an environment and (ii) a second portion of the patterned light onto a second surface in the environment, wherein the patterned light projector comprises a light source and a mask situated between the light source and the environment, wherein the first portion of the patterned light is generated by a first set of gaps located in a first region of the mask and configured to modulate the first portion of the patterned light to have a first intensity, wherein the second portion of the patterned light is generated by a second set of gaps located in a second region of the mask and configured to modulate the second portion of the patterned light to have a second intensity, and wherein a second size of the second set of gaps is greater than a first size of the first set of gaps such that the second intensity is greater than the first intensity;

generating, by at least one image sensor, image data representing the environment, wherein at least some of the image data represents the environment illuminated by the first portion of the patterned light and the second portion of the patterned light;

identifying, by a control system and based on the image data, an object of interest within the environment; and causing, by the control system and based on identifying the object, repositioning of the patterned light projector such that the first portion of the patterned light is directed onto the object.

13. The method of claim 12, wherein the second region of the mask surrounds and is coplanar with the first region of the mask.

14. The method of claim 12, further comprising:
determining, based on the image data, that the object is illuminated by the second portion of the patterned light; and
causing the repositioning of the patterned light projector further based on determining that the object is illuminated by the second portion of the patterned light.

15. The method of claim 12, further comprising:
determining an extent of exposure of a portion of the image data that represents the object; and
based additionally on the extent of exposure, causing the repositioning of the patterned light projector such that the first portion of the patterned light is directed onto the object.

16. The method of claim 12, further comprising:
determining, based on the image data, a value indicative of a distance between the object and the patterned light projector; and
based additionally on the value indicative of the distance, causing the repositioning of the patterned light projector such that the first portion of the patterned light is directed onto the object.

17. A non-transitory computer readable storage medium having stored thereon instructions that, when executed by a computing system, cause the computing system to perform operations comprising:
causing a patterned light projector to project (i) a first portion of patterned light onto a first surface in an environment and (ii) a second portion of the patterned light onto a second surface in the environment, wherein the patterned light projector comprises a light source and a mask situated between the light source and the environment, wherein the first portion of the patterned light is generated by a first set of gaps located in a first region of the mask and configured to modulate the first portion of the patterned light to have a first intensity, wherein the second portion of the patterned light is generated by a second set of gaps located in a second region of the mask and configured to modulate the second portion of the patterned light to have a second intensity, and wherein a second size of the second set of gaps is greater than a first size of the first set of gaps such that the second intensity is greater than the first intensity;

obtaining, from at least one image sensor, image data representing the environment, wherein at least some of the image data represents the environment illuminated by the first portion of the patterned light and the second portion of the patterned light;

identifying, based on the image data, an object of interest within the environment; and causing, based on identifying the object, repositioning of the patterned light projector such that the first portion of the patterned light is directed onto the object.

18. The non-transitory computer readable storage medium of claim 17, wherein the operations further comprise:
determining, based on the image data, that the object is illuminated by the second portion of the patterned light; and
causing the repositioning of the patterned light projector further based on determining that the object is illuminated by the second portion of the patterned light.

19. The non-transitory computer readable storage medium of claim 17, wherein the operations further comprise:
determining an extent of exposure of a portion of the image data that represents the object; and
based additionally on the extent of exposure, causing the repositioning of the patterned light projector such that the first portion of the patterned light is directed onto the object.

20. The non-transitory computer readable storage medium of claim 17, wherein the operations further comprise:
determining, based on the image data, a value indicative of a distance between the object and the patterned light projector; and
based additionally on the value indicative of the distance, causing the repositioning of the patterned light projector such that the first portion of the patterned light is directed onto the object.

* * * * *